Dec. 13, 1932.  J. C. CREAGMILE ET AL  1,890,935
CAMBER CORRECTING DEVICE
Original Filed Nov. 19, 1928  2 Sheets-Sheet 2
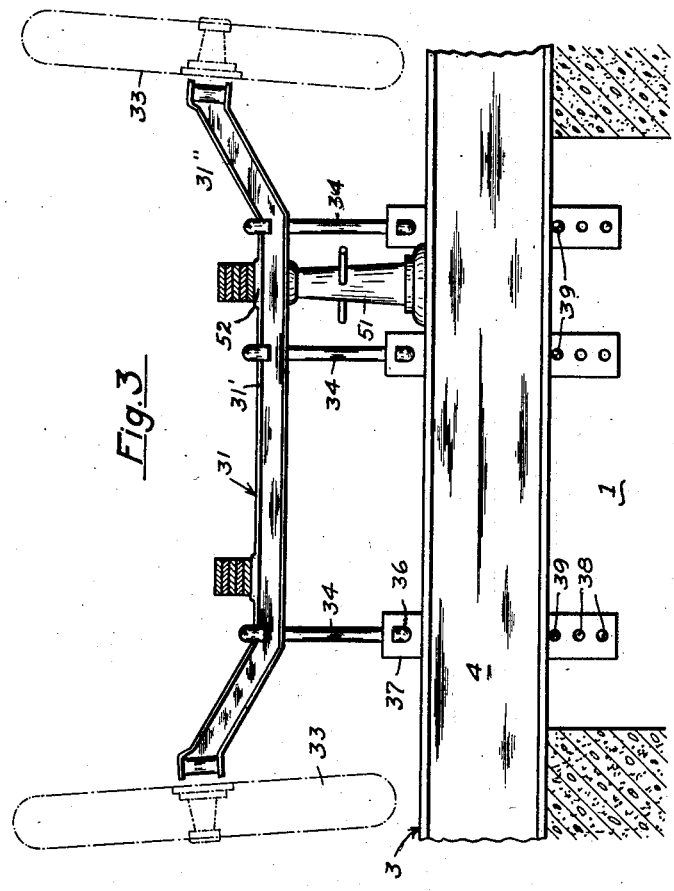
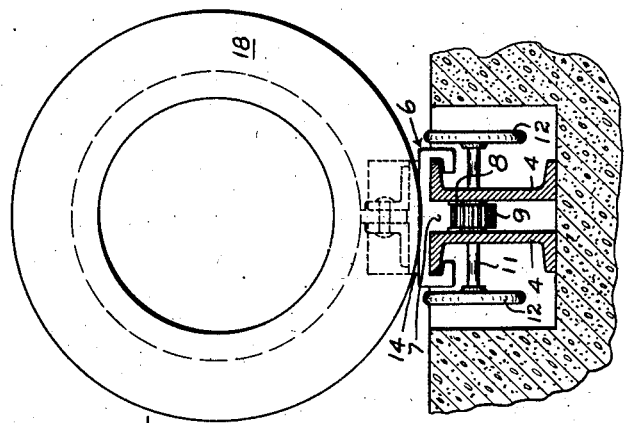
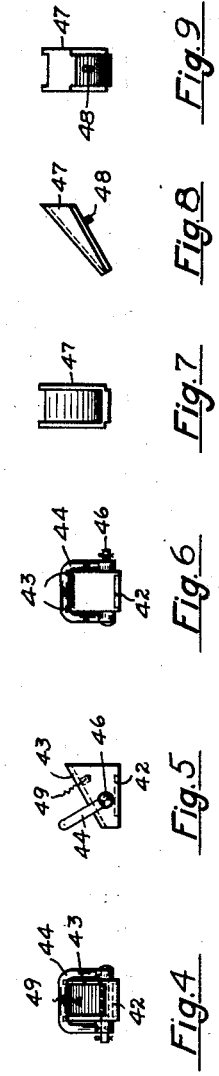
INVENTORS
John C. Creagmile
Fred H. Reiman
BY M. C. Frank
ATTORNEY.

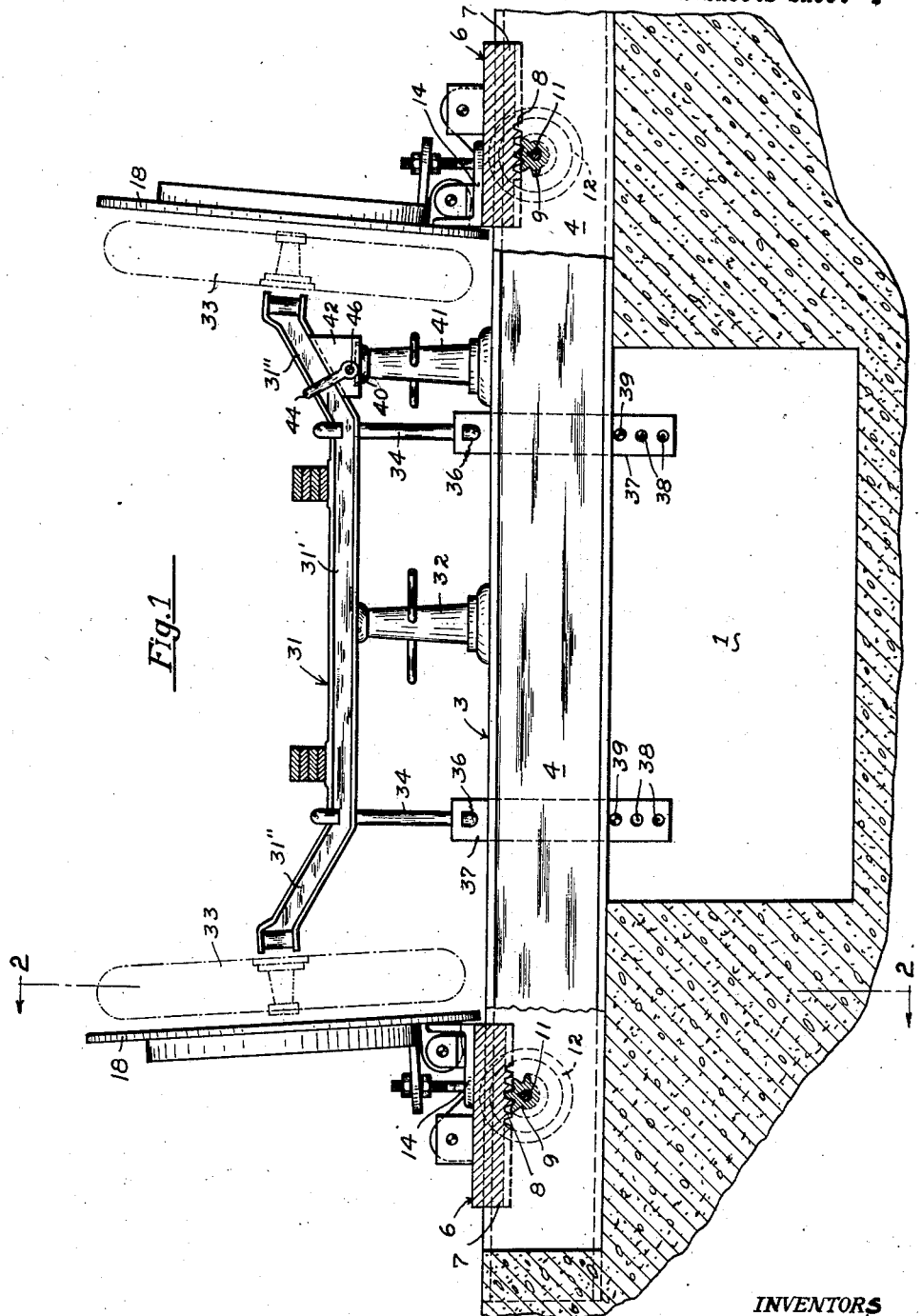

Patented Dec. 13, 1932

1,890,935

UNITED STATES PATENT OFFICE

JOHN C. CREAGMILE, OF BERKELEY, AND FRED H. REIMAN, OF SAN FRANCISCO, CALIFORNIA

CAMBER CORRECTING DEVICE

Original application filed November 19, 1928, Serial No. 320,395, Patent No. 1,791,803. Divided and this application filed December 26, 1929. Serial No. 416,453.

The present invention relates to an apparatus for correcting the camber of the steering wheels of an automobile or the like, and comprises a division of the invention disclosed in our application Serial Number 320,395, filed November 19, 1928, Patent No. 1,791,803, dated February 10, 1931.

An object of the invention is to provide particularly effective apparatus for carrying out the method of the invention, said apparatus including a gauging means for determining the amount of correction required or effected.

A further object of the invention is to provide for the use of a lifting jack as a thrust member between an axle portion and a fixed member, the engaged axle portion being oblique to the line of action of the jack.

Yet another object of the invention is to provide an improved means for fixing the jack head to the engaged axle portion for preventing a displacement of the jack from its operative position.

The invention possesses other objects and features of advantage, some of which, with the foregoing, will be set forth or be apparent in the following description of one embodiment of the invention and its application which are illustrated in the accompanying drawings, in which:

Figure 1 is an elevation showing the apparatus as applied for decreasing the camber of one of a pair of dirigible wheels carrying an axle, part of the figure being in section.

Figure 2 is a vertical section at 2—2 in Figure 1.

Figure 3 is a fragmentary view similar to Figure 1 and showing an arrangement of the apparatus for increasing the camber of a wheel.

Figures 4, 5 and 6 are respectively front, side and rear elevations of a saddle member for use with a jack of the apparatus.

Figures 7, 8 and 9 are respectively front, side, and rear views of a wedge-shaped shim for use with the aforesaid saddle member.

Referring to the drawings, the numeral 1 indicates a pit across which a beam 3 extends. As shown, the beam 3 comprises a pair of sills comprising channel members 4 placed back-to-back in slightly spaced relation to provide a guideway between their vertical webs. Bed plates 6 are mounted on the beam 3 adjacent opposite ends thereof and for slidable movement therealong. Tongues 7 extend downwardly from the plates 6 as guiding means therefor and the lower edges of said tongues are provided with racks 8 adapted to mesh with gears 9 keyed to shafts 11 which are journalled in and between the vertical webs of the channels 4. Hand wheels 12 are fixed to the extremities of the shafts 11 for rotating the latter whereby to move and adjustably dispose the bed plates 6 along the beam structure described.

Mounted on the bed plates 6 in generally erect position are centrally perforated discs 18, said discs providing plane inner faces for engagement with the outer faces of wheels 33 to be tested. The purpose of the discs 18 is to determine the degree of toe-in and camber of said wheels, and it is therefore desirable that said discs be mounted for adjustment to different angular positions with respect to the sills 4 about vertical and horizontal axes for disposing them to indicate proper degrees of toe-in and camber respectively. Accordingly, the discs 18 are so mounted on the bed plate 6 as to provide for such adjustments; the present mounting of each disc 18 is shown and described in detail in our before mentioned application, Serial Number 320,395, and essentially comprises a turntable 14 for adjusted rotation about a vertical axis and carrying the disc 18 for adjusted swinging about a horizontal axis.

When a disc 18 is properly set, its advancement against a wheel will simultaneously indicate the correctness both of toe-in and camber for the wheel. Correction for toe-in is effected through the adjustment of the length of the usual tie rod (not shown) of the steering gear and may be checked with the appropriate disc as it is effected. Correction of camber is effected through appropriately bending the axle 31 between the wheels 33, and it is to the method and means for accomplishing this correction that the present invention particularly relates; the servicing of an automobile for this purpose will now be described.

In using the present apparatus for gauging and/or correcting the toe-in and camber of a pair of dirigible wheels 33, the vehicle (not shown) of which the wheels 33 are a part is driven to a position where the said wheels come to rest on the beam 3 and across the space between the sills 4 providing the beam. The vehicle brakes being set, a jacket 32 is utilized (Figure 1) to raise the axle and wheels until the wheels clear the beam. In order to rigidly secure the axle 31 against any rocking movement on the jack 32, we employ C-shaped links 34, the upper hooks of which engage over the axle 31 while the lower hooks engage eyes 36 in bars 37 which depend therefrom and through the beam 3 between the members 4 thereof. As particularly shown, each bar 37 is flat and is provided with a plurality of holes 38 in its lower end.

When the axle 31 is raised somewhat by the jack 32, links 34 are hooked over the axle 31 at opposite sides of the jack and through the eyes of bars 37, and pins 39 are extended through appropriate and corresponding holes 38 of the bars 37 beneath the beam 3. The jack 32 is then further operated until the pins 39 forcibly engage the bottom of the beam 3 and the axle 31 is positively fixed in horizontal position.

As particularly shown, the axle 31 is a usual one having an intermediate and generally straight portion 31' disposed parallel to the ground, and end portions 31'' extending upwardly and outwardly from the ends of the portion 31' and providing steering knuckle bodies at their free extremities. If the camber of a wheel 33 has been found excessive, as by comparison with the appropriate disc 18, the adjacent axle portion 31'' may be bent upwardly at the angle or elbow of the axle defined at its juncture with the axle portion 31' by means of a jack 41 which exerts an upward pressure on said angular portion for bending the axle.

The jack 41, it is noted, operates perpendicularly of the beam 3 on which its base rests and obliquely to the axle portion 31'' which it engages. The oblique engagement of the jack with a portion 31'' tends, of course, to move the jack head 40 along the portion as force is exerted, and means are preferably provided for fixing the jack head 40 against such movement. As particularly shown in Figures 4, 5 and 6, a jack saddle is provided consisting of a wedge shaped body 42 for retained seated disposal on the jack head 40 and provided with upstanding flanges 43 which prevent the saddle from slipping off the axle. A yoke or bail 44 in the form of a clevis is secured to the saddle by means of a removable pin 46 extending through the saddle body 42 and the eyes of the bail 44. When the saddle body is engaged between the axle portion 31'' and the jack head 40, the bail 44 is mounted in place over the axle thereat, it being noted that any tendency of the saddle body to slip upwardly on the axle portion 31'' effects a binding action of the bail on said portion for frictionally locking the saddle body to the underside of the axle; this relation is shown in Figure 1.

Since the degree of angularity of different makes of axles varies, and application of force along a line is generally undesirable in cold-bending, we provide shim members 47, shown in Figures 7, 8 and 9. These shims are wedge-shaped and seat in the saddle 42 between the same and the engaged axle portion as part of the saddle. A tenon 48 on the underside of said shim engages a hole 49 in the top surface of said saddle 42. Thus, after selecting and mounting a shim 47 which approximates the angularity of the axle, an operator removes bolt 46, places the bail 44 over the said axle in the position shown in Figure 1, reinserts bolt 46, and operates the jack 41 for bending the axle 31 at or adjacent the axle-elbow to a degree indicated by the disc 18, which disc is moved against the wheel from time to time until the proper degree of bend has been accomplished.

In Figure 3, we show an arrangement for bending the axle 31 to increase camber. In this instance, a jack 51 is placed directly under a spring perch 52 of the axle 31 and a link 34 is placed on each side of said jack 51. Pins 39 are inserted beneath the sills 4 and the jack 51 is operated as a thrust member until said links are taut and the axle is bent as required. It is noted that the bending is accomplished at an end of the axle portion 31' and does not affect the camber of the other wheel as would be the case if the bending were accomplished in the middle of the portion 31' as by operation of the jack 32 shown in Figure 1.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative, and that such changes may be made, when desired, as fall within the scope of the appended claim.

Having thus described our invention, we claim as new and desire to secure by Letters Patent of the United States the following:

A wheel aligning device comprising a supporting beam, gauge members mounted on said beam and providing opposed and relatively adjustable reference surfaces, means for supporting an axle carried by dirigible wheels on and above said beam to dispose said wheels in facing relation to said surfaces, said axle comprising angularly related portions and one said axle portion being fixedly secured to said beam in parallel relation thereto, and a thrust member engaged between said beam and the second axle portion and operative perpendicularly to said beam and obliquely with respect to said second axle portion, and means releasably fixing said jack to said second axle portion at its point of engagement therewith.

In testimony whereof, we affix our signatures.

JOHN C. CREAGMILE.
FRED H. REIMAN.